(12) United States Patent
Vasquez

(10) Patent No.: US 11,587,358 B2
(45) Date of Patent: Feb. 21, 2023

(54) MANAGING CONTENT ON IN-FLIGHT ENTERTAINMENT PLATFORMS

(71) Applicant: Panasonic Avionics Corporation, Lake Forest, CA (US)

(72) Inventor: Edwin Vasquez, Orange, CA (US)

(73) Assignee: PANASONIC AVIONICS CORPORATION, Irvine, CA (US)

(*) Notice: Subject to any disclaimer, the term of this patent is extended or adjusted under 35 U.S.C. 154(b) by 364 days.

(21) Appl. No.: 16/831,560

(22) Filed: Mar. 26, 2020

(65) Prior Publication Data

US 2021/0303831 A1 Sep. 30, 2021

(51) Int. Cl.
G06V 40/16 (2022.01)
H04W 4/80 (2018.01)
B64D 11/00 (2006.01)
G06V 20/59 (2022.01)

(52) U.S. Cl.
CPC ........ G06V 40/174 (2022.01); B64D 11/0015 (2013.01); G06V 20/59 (2022.01); G06V 40/168 (2022.01); H04W 4/80 (2018.02)

(58) Field of Classification Search
CPC .... G06V 40/174; G06V 20/59; G06V 40/168; B64D 11/0015; H04W 4/80
USPC ....................................................... 382/118
See application file for complete search history.

(56) References Cited

U.S. PATENT DOCUMENTS

| | | |
|---|---|---|
| 9,852,355 B2 | 12/2017 | Couleaud et al. |
| 2011/0314488 A1 | 12/2011 | Keen et al. |
| 2013/0129210 A1 | 5/2013 | Na |
| 2013/0159895 A1 | 6/2013 | Aarabi |
| 2016/0128450 A1 | 5/2016 | Saito et al. |
| 2016/0316237 A1* | 10/2016 | Couleaud ............. G06V 10/141 |
| 2017/0180036 A1 | 6/2017 | Schaupmann et al. |
| 2019/0164210 A1* | 5/2019 | Kornilov ............. G06Q 30/0631 |

FOREIGN PATENT DOCUMENTS

| | | |
|---|---|---|
| CN | 108292413 A | 7/2018 |
| KR | 20190049555 A | 5/2019 |

* cited by examiner

*Primary Examiner* — Ayodeji O Ayotunde
(74) *Attorney, Agent, or Firm* — Perkins Coie LLP

(57) ABSTRACT

Introduced here are technologies for examining an image of an airline passenger, while the passenger is onboard. The image may be examined for abnormalities, the passenger's mood, and/or the passenger's expression. The image analysis may be supplemented by data from a suite of sensors such as heart rate monitors, accelerometers, gyroscopes, and the like. The image and the sensor data are then analyzed to detect abnormalities, identify related recommendations, and suggest products and services offered onboard or at the destination that are related to the abnormalities and recommendations. The general purpose is to improve an airline passenger's travel experience while on board the flight.

20 Claims, 11 Drawing Sheets

MANAGING CONTENT ON IN-FLIGHT ENTERTAINMENT PLATFORMS

TECHNICAL FIELD

The disclosed teachings relate generally to digital entertainment systems. More specifically, the disclosed teachings relate to in-flight entertainment systems.

BACKGROUND

Flight travel has connected the world in ways that was far beyond the dreams of the first flyers in the early 20th and late 19th centuries. Now there are over 100,000 flights that take off every day from over 40,000 airports. Air travel typically involves journeys over extended distances that at the very least take several hours to complete. Airlines therefore provide on-board in-flight entertainment (IFE) systems that offer a wide variety of multimedia content and other on-board services (e.g., food, games, etc.) for passenger enjoyment.

SUMMARY

The disclosed embodiments include an in-flight vanity (IFV) system. The IFV system includes an in-flight entertainment (IFE) platform and a smart mobile device communicatively coupled to the IFE. The IFE platform includes a communication mechanism, a display mechanism, an input mechanism, a processor, and memory. The communication mechanism can communicate with the smart mobile device to send and receive content. The display mechanism can display content stored on-board the IFE platform, content received from the mobile device, or received from other sources. The input mechanism can include multiple mechanisms such as a keyboard, touch-screen, audio receiver, or the like. The input mechanism can, via the communication mechanism and processor, for example, alter the display mechanism. The processor can execute commands stored in the memory or received from other devices such as to communicate a particular message to the flight-attendants. The memory can store executable code, content, and other relevant data.

Embodiments also include a computer-implemented method performed by the IFV system. The method includes establishing a communication channel for the IFV system between the IFE and the mobile device, and sharing content between the IFE and mobile device such that the content can be analyzed to provide the user with relevant information. The shared content can be images, videos, audio, health statistics, or other content that can be processed on a mobile device and/or an IFE platform. Moreover, the method can include analyzing the content to provide the user with details of one's health conditions, recommendations for in-flight services, recommendations to improve current health status, recommendations regarding the destination, and other relevant information.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other aspects of the disclosed embodiments will be apparent from the accompanying Figures and Detailed Description.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
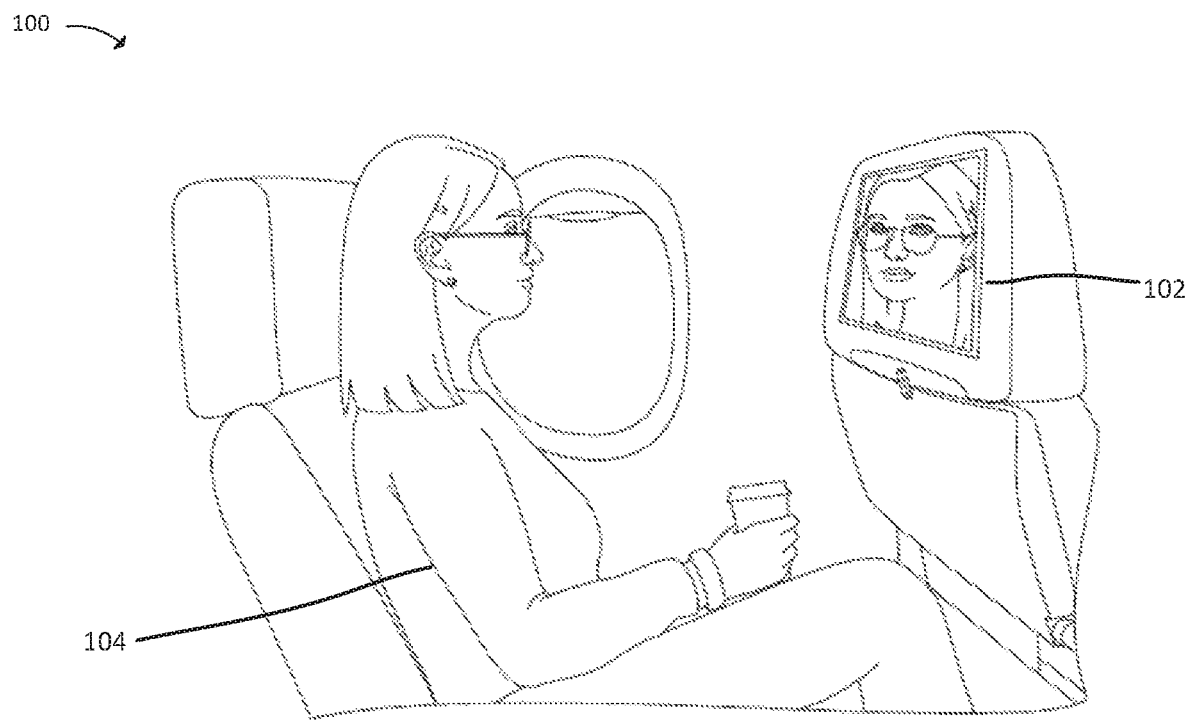
FIG. 1 illustrates the environment in which the disclosed embodiments can be implemented.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of those concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used here, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," "or the like, refer to any connection or coupling, either direct or indirect, between two or more elements. The coupling or connections between the elements can be physical, logical, or a combination thereof.

The embodiments below are described in reference to in-flight systems in airplanes. However, the embodiments can be equally applicable in other commercial and/or passenger vehicles such as trains, cars, ships, buses, and the like.

There are several issues that passengers regularly express frustration about during airline travel. For example, lack of leg room, the comfort of the seats, luggage allowances, and the like. Two of the primary complaints are the sheer duration of the flights and its health impact. Generally, the duration of flights is categorized in four ways: short-haul, medium-haul, long-haul, and ultra-long-haul. Short-haul flights are under three hours; medium-haul flights are between three to six hours; long-haul flights are between six to twelve hours; and ultra-long-haul flights are over twelve hours. Lately, due to an increase in international tourism and international business relations, long-haul and ultra-long-haul flights are becoming more and more popular.

One of the ways that airline companies have addressed easing passengers on long flights is by adding in-flight entertainment (IFE) systems on board. IFE platforms can include monitors and audio systems to watch TV shows, movies, listen to music, play games, and much more. These systems have helped passengers pass the time and be entertained while flying. Although IFE platforms entertain the passengers, they are falling behind the current technological trend in two important ways: connectivity to other devices and health monitoring. Nowadays, people get most of their entertainment from their mobile devices (i.e., phones or tablets). However, flights generally prohibit mobile device usage except under "airplane mode". This restriction prevents passengers from using their mobile devices as they would normally. Furthermore, current IFE platforms do little to address health issues caused by airline travel. For example, airline travel can dehydrate skin, decrease blood flow, increase negative effects of exposure to the sun, increase oil production by your glands, and other such effects.

Thus, the present in-flight entertainment technology does not adequately address the health issues and the lack of entertainment issues that occur during flights. Accordingly, the disclosed techniques address these technical limitations.

Generally, an in-flight vanity (IFV) system is designed for use on an airplane. There are several components and embodiments of use of an IFV system. For example, an embodiment of the IFV system can include a smart mobile device such a smartphone or tablet, and an in-flight entertainment (IFE) system onboard an airplane. The mobile device can be a passenger's mobile device and the IFE system can be associated with the same passenger. During flight, a mobile device is usually turned off, put in airplane mode, or otherwise limited in functionality. Nevertheless, once indicated by the airline staff (i.e., pilot, host, or hostess), a mobile device can utilize various functionalities such as connecting to an on-board Wi-Fi source, Bluetooth, near field communication (NFC), or the like. Furthermore, a mobile device can include cameras, sensors, input mechanisms, communication mechanisms, speakers, etc.

FIG. 1 illustrates the environment in which the disclosed embodiments can be implemented. The environment 100 can be within an airplane and include IFE display 102. An IFE platform can be part of the various systems provided on the airplane. An IFE platform is usually placed on the rear of the headrest in front of the passenger. IFE platforms can include displays, sensors, cameras, an input device such as a key board or touch screen, and WiFi, Bluetooth and/or NFC connectivity. IFE platforms can be used for various purposes such as streaming videos, viewing images, playing games, reading, or the like.

The IFE platform can be mounted on the rear of a headrest and face the passenger 104. The IFE can be removable, permanently attached, adjustable, or the like. For example, passenger 104 may not be able to clearly view the screen due to glare. Thus, passenger 104 can adjust the angle of IFE display 102. Additionally, passenger 104 can remove IFE display 102 from the head rest. In this case, the head case mounting may as a docking station that provides power to IFE display 102. The IFE display 102 can also be connected via a wire to the dock or be wireless. In some embodiments, IFE display 102 can be a touchscreen. In some embodiments, IFE display can be connected to a remote. The remote can act as the controller for IFE display 102.

Figure 2:
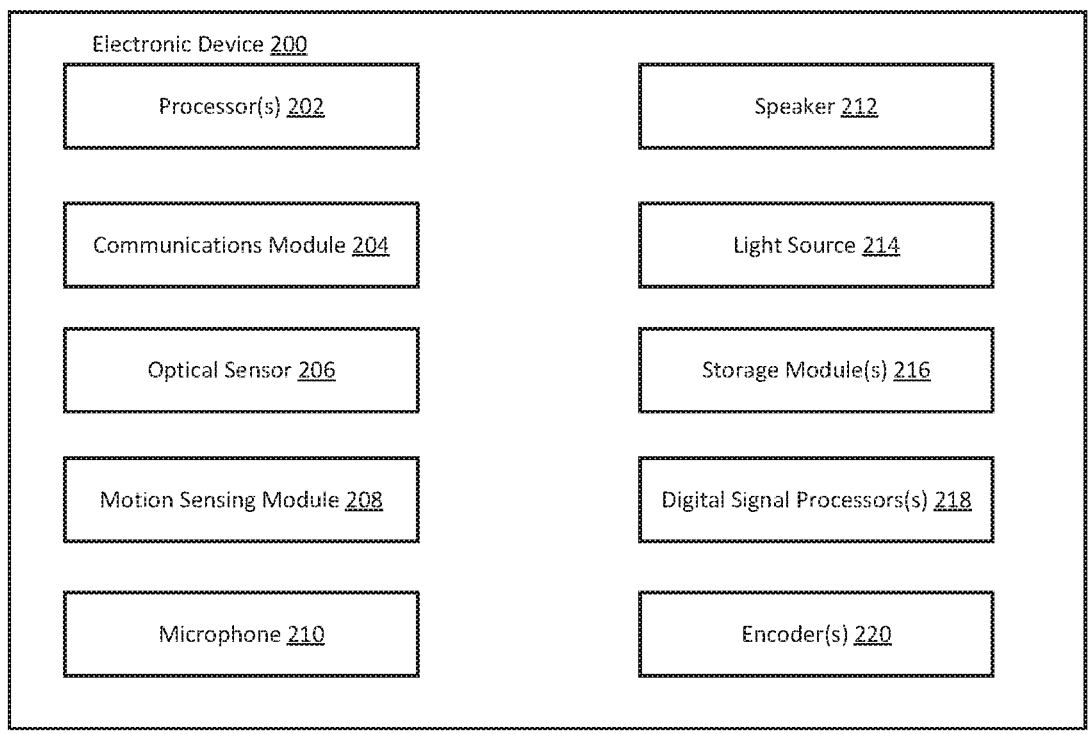
FIG. 2 is a high-level functional block diagram illustrating the architecture of an electronic device that can be used to implement the disclosed embodiments.

FIG. 2 is a high-level functional block diagram illustrating the architecture of an electronic device 200 such as those within the IFV system (i.e., IFE platform or mobile device). As further described below, the electronic device 200 may generate content when prompted by the passenger and while monitoring the environment, and then transmit the content to another electronic device (e.g., an IFE platform or smart mobile device) for further review.

The electronic device 200 can include one or more processors 202, a communication module 204, an optical sensor 206, a motion sensing module 208, a microphone 210, a speaker 212, a light source 214, one or more storage modules 216, digital signal processor(s) 218, and encoder 220.

The processor(s) 202 can execute instructions stored in the storage module(s) 216, which can be any device or mechanism capable of storing information. In some embodiments, a single storage module includes multiple computer programs for performing different operations (e.g., image recognition, image alteration, providing recommendations), while in other embodiments each computer program is hosted within a separate storage module.

The communication module 204 can manage communication between various components of the electronic device 200. The communication module 204 can also manage communications between the electronic device 200 and another electronic device. For example, the communication module 204 may facilitate communication with a mobile phone, tablet computer, wireless access point (WAP), etc. As another example, the communication module 204 may facilitate communication with a base station responsible for communicating with a network-connected IFE platform or mobile device. More specifically, the communication module 204 may be configured to transmit content generated by the electronic device 200 to an IFE platform or mobile device for review. As further described below, the IFE platform or mobile device may examine the content itself or transmit the content to another electronic device for examination.

The communication module 204 can manage communication with electronic device(s) within the observed environment and/or a network-connected computer server. In some embodiments, different communication modules handle these communications. For example, an IFE platform may include one communication module for communicating with the electronic device(s) via a short-range communication protocol, such as Bluetooth® or Near Field Communication, and another communication module for communicating with the network-connected computer server via a cellular network or the Internet.

As noted above, electronic device 200 (i.e., IFE platform or mobile device) may reside in a network environment. Thus, the IFV system and its components may be connected to one or more networks. Network include PANs, LANs, WANs, MANs, cellular networks, the Internet, etc. Additionally or alternatively, the IFV system and its components can be communicatively coupled to electronic device(s) over a short-range communication protocol, such as Bluetooth® or NFC.

The optical sensor 206 (also referred to as "image sensors") can be configured to generate optical data related to the observed environment (i.e., the cabin, aisle, or area near the seat of the passenger) or passenger. Examples of optical sensors include charged-coupled devices (CCDs), complementary metal-oxide-semiconductors (CMOSs), infrared detectors, cameras, etc. In some embodiments, the optical sensor 206 is configured to generate a picture of the observed environment or passenger responsive to, for example, determining that movement has been detected within the observed environment. In other embodiments, the optical data generated by the optical sensor 206 is used by the motion sensing module 208 to determine whether movement has occurred. The motion sensing module 208 may also consider data generated by other components (e.g., the microphone) as input. Thus, an electronic device 200 may include multiple optical sensors of different types.

The optical sensor detects light qualities that correspond to a pixel of the generated image. The detection occurs for a predetermined period depending on factors such as the desired quality and the shutter speed (e.g., 20 microseconds or 100 microseconds). During that period, the detected light properties are converted to a voltage. In some examples, the voltage indicates a property of the pixel, such as the lumens or color.

Parameters applied to the optical sensor determines how the voltage signal is read and processed. For example, the voltage signal may be amplified before they are read. Additionally, the sensor may use a set of parameters for a day mode and another set of parameters for a night mode. The night mode parameters may take into account the fact that there is very low energy and color information in night-time images. Due to the relatively low energy of night images, the voltage signal amplitude is relatively low and must be amplified. When then signal is amplified, noise becomes more pronounced. Additionally, pixels may be combined to gather more information per signal.

The optical sensor 206 may be in communication with a digital signal processor (DSP) 218. The DSP is a microprocessor that executes algorithms to filter, compress, or otherwise process signals. For example, a DSP may receive the detected voltage signal from the optical sensor 2016.

The microphone 210 can be configured to record sounds within the observed environment. The electronic device 200 may include multiple microphones. In such embodiments, the microphones may be omnidirectional microphones designed to pick up sound from all directions. Alternatively, the microphones may be directional microphones designed to pick up sounds coming from a specific direction. For example, if the electronic device 200 is intended to be mounted in a certain orientation (e.g., such that the camera or motion sensing module 208 is facing the passenger), then the electronic device 200 may include at least one microphone arranged to pick up sounds originating from near the point of focus.

The speaker 212, meanwhile, can be configured to convert an electrical audio signal into a corresponding sound that is projected into the observed environment. Together with the microphone 210, the speaker 212 enables a passenger located within the observed environment to converse with another passenger located outside of the observed environment. For example, the other individual may be a passenger who has a computer program (e.g., a mobile application) installed on her mobile phone for interacting with an IFV system on the same or different plane.

The light source 214 can be configured to illuminate the observed environment. For example, the light source 214 may illuminate the observed environment responsive to a determination that movement has been detected within the observed environment. The light source 214 may generate metadata specifying a time at which each illumination event occurred, a duration of each illumination event, etc. This metadata can be examined by the processor(s) 202 and/or transmitted by the communication module 204 to an electronic device for further review.

Embodiments of the electronic device 200 may include some or all of these components, as well as other components not shown here. For example, if the electronic device 200 is an IFE platform, then some components (e.g., the microphone 210, speaker 212, and/or light source 214) may not be included. As another example, if the electronic device 200 is a mobile device, then other components (e.g., the camera 208, microphone 210, and/or speaker 212) may be included.

Figure 3:
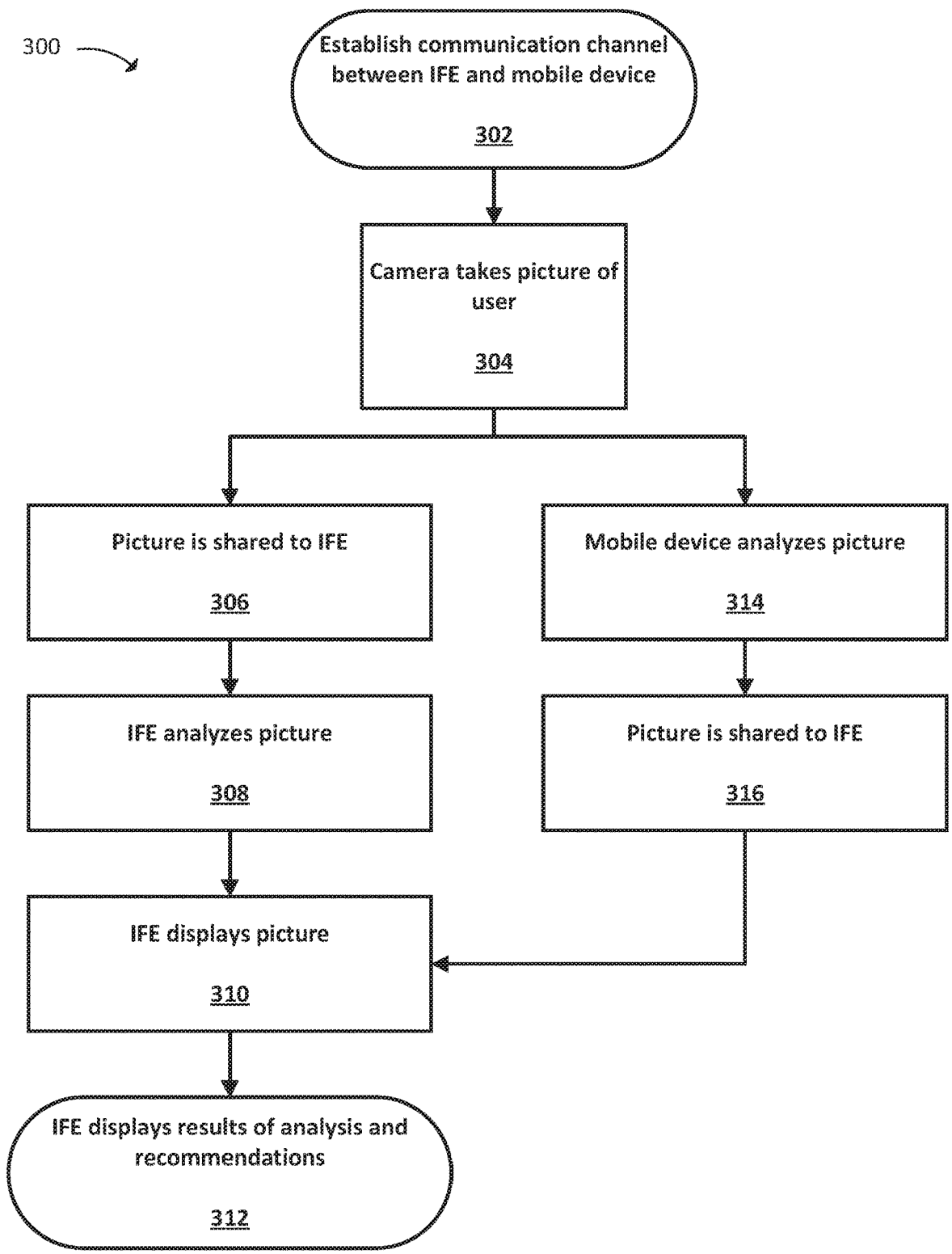
FIG. 3 is a flow diagram of a process for managing shared content using the IFV system, consistent with various embodiments.

FIG. 3 is a flow diagram of a process for managing content shared with the IFV system. The process for managing content 300 includes various blocks. At block 302, a communication channel is established between an IFE platform and a mobile device. The communication channel can be wireless or wired. As discussed above in conjunction with communications module 204 of FIG. 2, a wireless channel can be based on, for example, WiFi, Bluetooth, NFC, and/or the like. Additionally or alternatively, a wired communication channel can be, for example, via universal serial bus (USB), micro USB, USB-c, or the like. In some embodiments, a passenger, once on board an airplane, can connect their smart mobile device to the IFE platform that corresponds to their seat. The passenger can use Bluetooth connectivity to establish a connection. Subsequently, the passenger can share content from their smart mobile device to the IFE platform. For example, the passenger can share a photo to view on the IFE platform display, rather than on their smart mobile device.

In some embodiments, the airline company can require a smart application to be downloaded by the passenger onto their mobile device in order to use the onboard IFE platform. The smart application may retrieve or request information such as the passenger's seat number, itinerary, preferences, etc. In some embodiments, the smartphone application, once downloaded, can prompt a passenger to input the seat number and flight number of the passenger's flight. Once recorded, the smart application can automatically retrieve which IFE platform to connect the passenger's smart mobile device to. Moreover, the application can be a means to control the IFE platform such as to change the display, share content, request help, etc. For example, a passenger can download an application prior to boarding the plane. The passenger can upload their itinerary onto the application. The application can then parse the itinerary to detect information in order to automatically connect to the correct IFE platform when the passenger boards the flight.

At block 304, the passenger uses a camera to capture an image of themselves. In general, the camera can be the camera on the mobile device, on the IFE platform, or other camera. In some embodiments, the camera can be aboard the mobile device. The camera can be a front-facing or rear-facing camera aboard the mobile device. In some embodiments, the camera is a separate device that has wireless connectivity capabilities. For example, the camera can be a digital single lens reflex (DSLR) camera with WiFi connectivity capabilities. In some embodiments, the camera can be aboard the IFE platform and facing the passenger.

For example, a passenger can use their mobile device to take a picture of themselves. Moreover, the passenger may have downloaded the smart application to connect with the onboard IFE platform. The picture can then be accessed, on the mobile device, via the application. Subsequently, the application can prompt the passenger to transfer the image to the IFE platform. In some embodiments, a passenger can use a front-facing camera aboard an IFE platform. The passenger may be able to take a picture using a remote connected the IFE platform, a touchscreen prompt, or the like.

In some embodiments, a camera is prompted by motion sensing module 208 of FIG. 2. For example, motion sensing module 208 can trigger a camera on an IFE platform anytime the passenger moves. Thus, the camera can take multiple pictures during the flight. Additionally or alternatively, a camera can be programmed to take a pictures at various time intervals. For example, a camera can be programmed to take a picture every thirty minutes. In some embodiments, the camera can be triggered by altitude. For example, a picture can be taken anytime the altitude has a delta of more than 1000 ft.

After block 304, in some embodiments, the process proceeds to block 306 depending on which device took the picture. At block 306, a camera not aboard the IFE platform took the picture and transferred the picture to the IFE platform. As mentioned above, the transfer can be done with wireless or wired methods. Once received by the IFE platform, the process proceeds to block 308.

At block 308, the IFE platform analyzes the picture. The IFV can analyze the picture of assess the skin, expression, age, and other information of the passenger. To perform image analysis, the IFE platform may have been initially trained in an iterative manner, with simulated images, and/or other known techniques. The images may include images of people having various skin tones, hair styles, sizes, facial features, etc. Additionally, the training images can include images taken in various lighting settings such as outdoor, indoor, daytime, night time, etc. The iterative training may be performed before the components of the IFE platform are produced. For example, the system may be under development and not been deployed within airplanes. During training, large amounts of refence images are compared with altered images. By comparing the reference images to the altered images, the IFE platform can be trained to detect the alterations. Once the training is performed, the detection logic may be implemented into the various manufactured components.

In some embodiments, the IFE platform can utilize various models or methods to evaluate an image. A method can be a collection of logic, data, algorithms, and the like which allow to evaluation of an image. Examples of image assessment methods include Mean-Squared Error (MSE). MSE measures the average squared difference between actual and ideal pixel values. Another method is peak Signal-to-Noise Ratio (pSNR) calculation which indicates the ratio of pixel intensity to the distortion. Another method is the Structural Similarity (SSim) index metric which combines local image structure, luminance, and contrast into a single quality score. The structures are viewed as patterns of pixel intensities based on luminance and contrast.

Additionally, a method can be blind or reference-less. In these methods, a high-quality image or raw data is used as a reference to compare against a taken picture. These methods are pixel-based, parametric or bitstream based, or a hybrid thereof. An example of a reference-less model is Blind/Reference-less Image Spatial Quality Evaluator (BRISQUE). The BRISQUE model is trained by using a database of images of people with known distortions. The model uses image statistics to quantify the distortions. Subsequently, a quality score or value is derived from those distortions. Another reference-less model is the Natural Image Quality Evaluator (NIQE) model. NIQE is trained based on a database of flawless images. Thus, a NIQE can identify distortions by analyzing the flawless images.

In some embodiments, the IFE platform can be iteratively trained while it is being used. For example, passengers may provide feedback that the IFE platform did not detect a particular abnormality such as discoloration. Thus, the system can account for this error by re-evaluating the image of that passenger with updated methods and/or criteria.

At block 310, the IFE platform displays the picture to the passenger. In some embodiments, block 310 can be performed prior to block 306. Furthermore, the picture can be displayed in its original form or with additional features. For example, the picture can report the findings of the analysis by pointing to abnormalities or in response to other data.

At block 312, the IFE platform displays the results of the analysis and provides recommendations. Generally, the recommendations can be geared towards improving the travel experience of the passenger. This can be accomplished by providing recommendations to improve, for example, the passenger's health, mood, etc. The display can be in various forms. For example, the display can provide a list of the detected abnormalities, highlight abnormal areas on the picture, and/or other similar methods. In some embodiments, the IFV system analyzes the pictures of a user to provide recommendations to in-flight products, provide recommendations for the destination (i.e., airport, city, or country), provide recommendations to improve the passenger's flight experience, provide recommendations to improve the passenger's health, edit the passenger's picture, etc.

The recommendations can be based on a correlation between abnormalities detected on the passenger's picture and available products and services. The IFE platform can be trained by methods mentioned above such as iterative methods, pre-deployment training, etc. The training can result in forming correlations between abnormalities and recommendations. For example, an abnormality detected by an IFE platform applying the BRISQUE model may be that the passenger has under-eye bags. The IFE platform may be trained to relate under-eye bags to tiredness. A recommendation for tiredness may be to order the onboard coffee, an extra pillow, a coffee shop at the destination airport, etc.

Additionally, the recommendations can be related to addressing health conditions. For example, the IFE platform may that that the picture of the passenger shows skin discoloration. As a remedy, the IFE platform may recommend that the passenger get up and take a walk up and down the aisle. Additionally or alternatively, the recommendation may be for a stretch such as twisting the torso or titling the passenger's neck.

In some embodiments, the recommendations can include identifying products and services based on, for example, the products available on board, from preferred vendors, etc. For example, an IFE platform can be updated with a new list of items prior to each flight. The updates can occur through the over the air updates (OTAs), version updates, or the like. Each product or service on the list can be associated with a variety of abnormalities. For example, an IFE platform can be trained by the NIQE model to recognize a hundred different abnormalities (i.e., tiredness or sleepiness). Furthermore, the flight can have twenty products or services on board (i.e., sleep masks, pillows, or coffee). Each of the products and services can be programmed to be associated with an abnormality. Thus, when an IFE platform detects the passenger exhibiting an abnormality, it recommends the associated product and/or service to the passenger.

Returning to block 304, in some embodiments, the mobile device can perform the analysis. At block 314, the mobile device can perform the functionality described in conjunction with block 308. After which, the mobile device can share the picture with the IFE at block 316. The process then proceeds to block 310 and block 312.

In some embodiments, after the analysis is complete, the memory of the IFE platform is purged or over written to remove the image and data of the passenger. Overwriting algorithms use a precise set of rules to remove any part of the original data from the memory by writing new data on the memory. Data that has been overwritten is considered to be unrecoverable. In some embodiments, the data can be transferred to the passenger's mobile device prior to it being overwritten on the IFE platform. This allows the passenger to transfer the data to another IFE platform during another flight.

Figure 4:
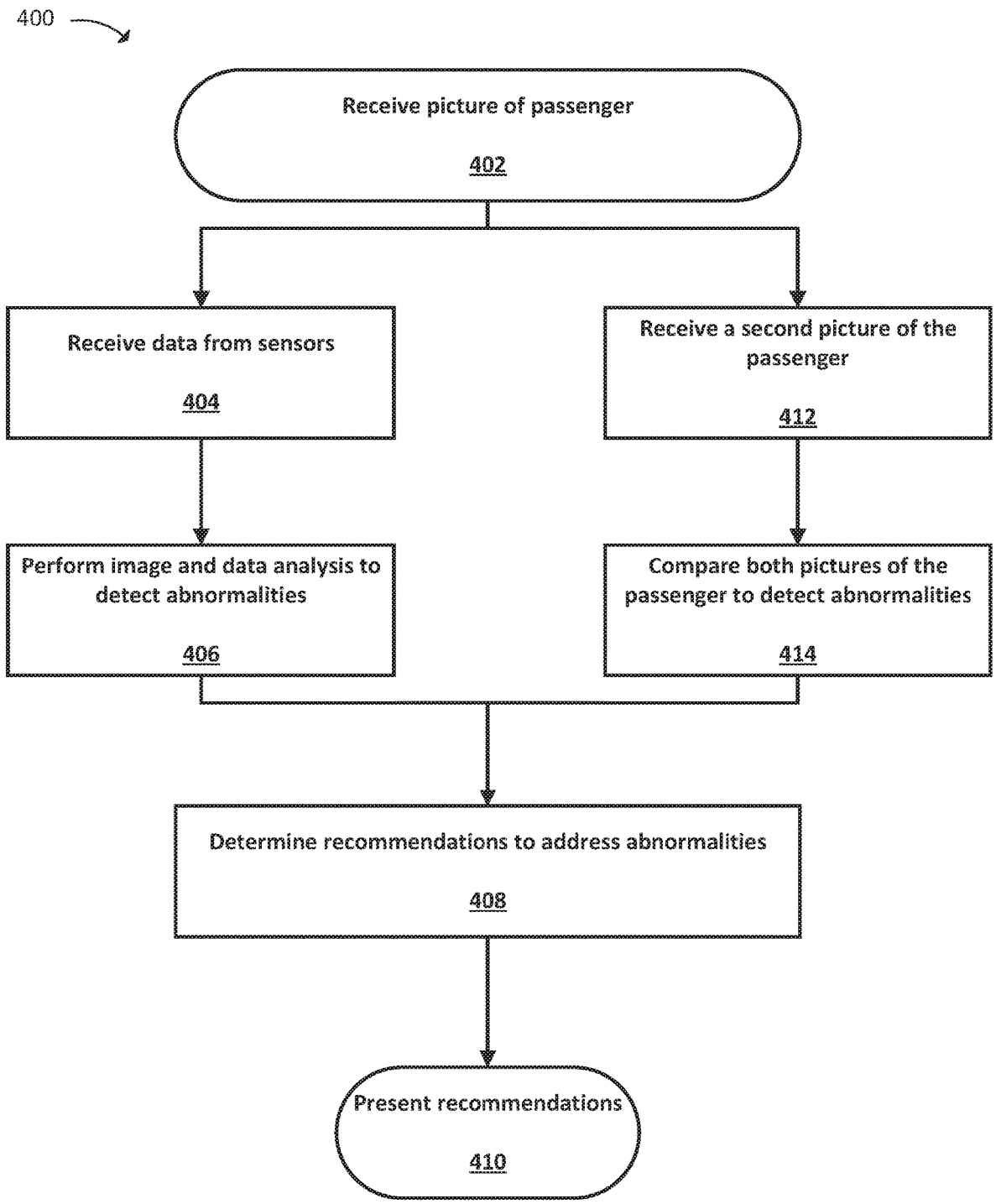
FIG. 4 is a flow diagram of a process for analyzing pictures, consistent with various embodiments.

FIG. 4 is a flow diagram of a process for analyzing pictures, consistent with various embodiments. The process illustrated in FIG. 4 can be executed by the IFE platform, a mobile device, and/or both. Generally, the IFV system can analyze a picture of a passenger by using multiple methods, as described above. In some embodiments, the system may incorporate data from sensors or use a second picture of the user. At block 402, an IFV system (i.e., IFE platform and/or mobile system), can receive a picture of the passenger. This can be accomplished similarly to blocks 304, 306, and 314 of FIG. 3.

At block 404, the IFV system can receive data from sensors. The sensors can be aboard a mobile device or an IFE platform. The sensors can be various sensors such as a motion sensor, heart rate sensor, temperature sensor, accelerometer, proximity sensor, gyroscope, optical sensor, etc. For example, the optical sensor (i.e., optical sensor 206 of FIG. 2) can be a camera and provide data such as detecting the passenger's head nodding down indicating that the passenger is falling asleep. In another example, the data could be of a passenger's heart rate, where a low heart rate can indicate that the passenger is sleeping. Alternatively, an abnormality in the detected heart rate could prompt the IFV system to alert the airplane staff.

At block 406, the IFV system performs analysis of both the sensor data and picture. The analysis can be based on the techniques described above and known data analysis techniques such as clustering, neural nets, reinforcement learning, and the like. The sensor data and analysis of the passenger's picture can be combined to better detect abnormalities and recommendations. For example, an accelerometer on a passenger's mobile device may detect no movement for a prolonged period. In conjunction, a passenger's picture can show discoloration. Thus, the IFV system can recommend stretching or walking to increase blood flow.

In some embodiments, the IFV system may include pre-determined threshold values to breach prior to providing recommendations. The threshold values can be based on time, number of pictures, number of abnormalities, or the like. For example, an IFV system may be preprogrammed to only provide recommendations for a passenger indicating tiredness if the IFV system detects tiredness in five consecutive images. In some embodiments, the IFV can simultaneously incorporate sensor data to reach the threshold prior to analyzing five consecutive images. For example, after detecting tiredness in three consecutive images, the IFV system may analyze accelerometer data to corroborate that the passenger has been excessively active recently. This can lead to the IFV system recommending an energy bar from the in-flight menu.

In some embodiments, one or more sensors, such as an optical sensor (i.e., a camera) can perform the functionality described in conjunction with block 406. For example, a camera can be separate from the IFV system and have an onboard processor. Thus, the camera can take the picture, perform analysis, determine recommendations, and then transmit some or all this information to the IFV system. The IFV system can then, for example, display the recommendations to the user.

In some embodiments, multiple sensors can work collaboratively to determine recommendations. For example, a sensor suite comprising a camera and a motion sensor can monitor the passenger. The motion sensors, when triggered by the motion of the passenger can alert the camera to take a picture. The motion can then, with an onboard processor, analyze the data collected from the movement. Parallelly, the camera, with an onboard processor, analyze the picture. The motion sensor and camera can then, individually, determine recommendations and share with each other and the IFV system. Any of the components, the motion sensor, camera, or IFV system, can then determine which recommendations to present to the passenger, based on likelihood of conversion, commonalities, etc.

At block 412, another method of image analysis is performed. Here, the IFV system prompts the passenger for a second image. Subsequently, at block 414, the two pictures are compared to detect abnormalities in the passenger. For example, the second picture can be taken prior to the passenger boarding the flight. Alternatively, the smart application discussed above, may automatically prompt a passenger to upload a picture prior to boarding the flight. Thus, the in-flight picture can be compared to an out-of-flight picture to better detect abnormalities caused by air travel. After comparison, the process proceeds to blocks 408 and 410, which are similar to block 312 of FIG. 3.

Figure 5:
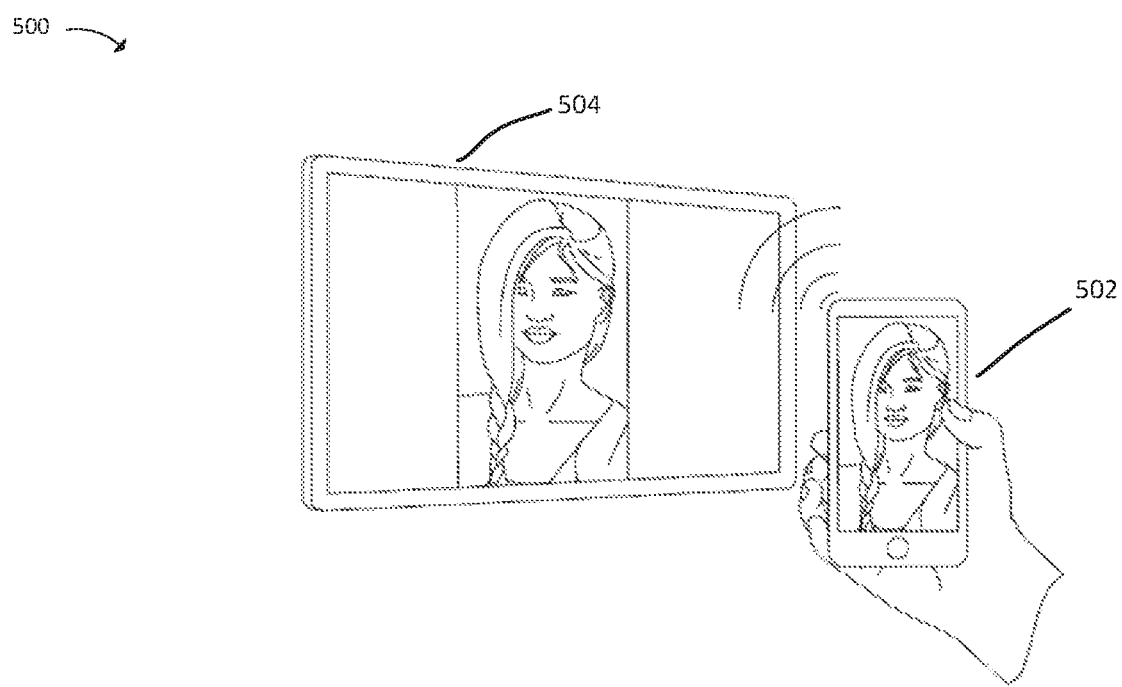
FIG. 5 is an illustration that depicts an IFE platform and mobile device wirelessly communicating with each other.

FIG. 5 is an illustration that depicts an IFE platform and mobile device communicating with each other. IFV system 500 includes mobile device 502 and IFE platform 504. The two devices can be communicatively coupled via WiFi, Bluetooth, near field communication, or the like. In some embodiments, the mobile device 502 and IFE platform 504 can screen share as depicted in FIG. 5. In some embodiments, the two devices can establish two-way communication channel where both devices share data with each other. For example, as discussed above, images videos, data (i.e., sensor data or abnormality data), or the like.

In some embodiments, the mobile device 502 and/or IFE platform 504 can generate reports based on the abnormality analysis discussed above. Subsequently, the report can be shared to the other device. For example, the abnormality detection can be performed on mobile device 502 and subsequently transferred to IFE platform 504 to generate recommendations based on the report. The report can include data such as which abnormalities were detected, at what time the analysis was performed, the flight's status during the analysis, and the like.

In some embodiments, the mobile device 502 can store the report generated during one flight. It can then anticipate the passenger needs during another flight. For example, a passenger may have experienced dehydration during a first flight. This information can be stored and used to prevent dehydration during a subsequent flight by sharing this report with the IFE platform onboard a second flight. The second IFE platform can then recommend, for example, a water bottle from the in-flight menu.

Figure 6:
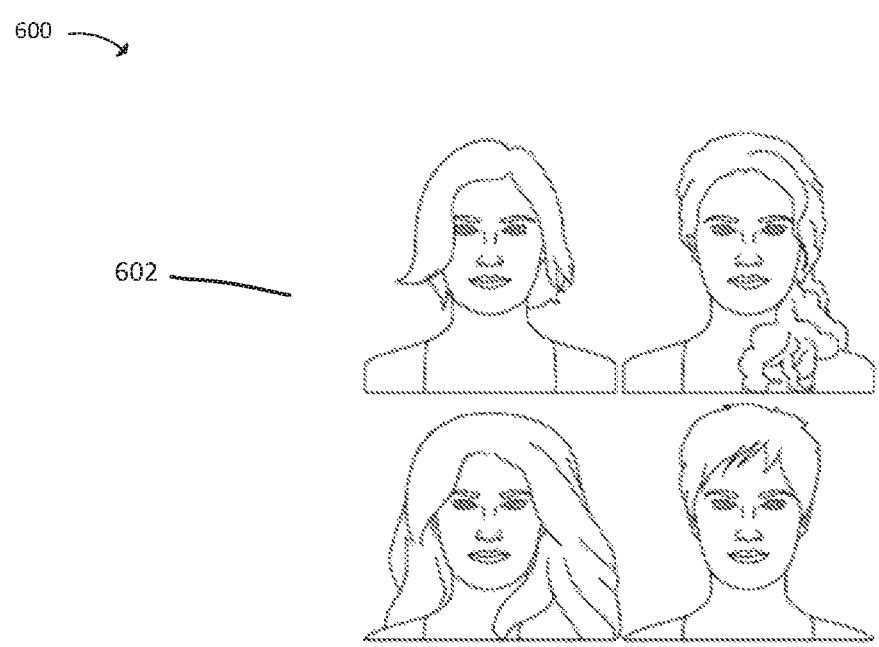
FIG. 6 illustrates an example of the hair style recommendation feature of an embodiment of an IFV system.

FIG. 6 illustrates an example of the hair style recommendation feature of an embodiment of an IFV system. Hair style recommendations 600 includes four different hair styles 602. In some embodiments, the IFV system can edit the pictures of the passenger. Here, the passenger can see what they would look like with four different hair styles 602. In some embodiments, the passenger may be able to select which hairstyle they prefer the most, and the IFV system may recommend a hairstylist at the destination. In some embodiments, the IFV system may recommend hair styling products that are sold onboard or in stores at the destination such as hair spray or the like.

Figure 7:
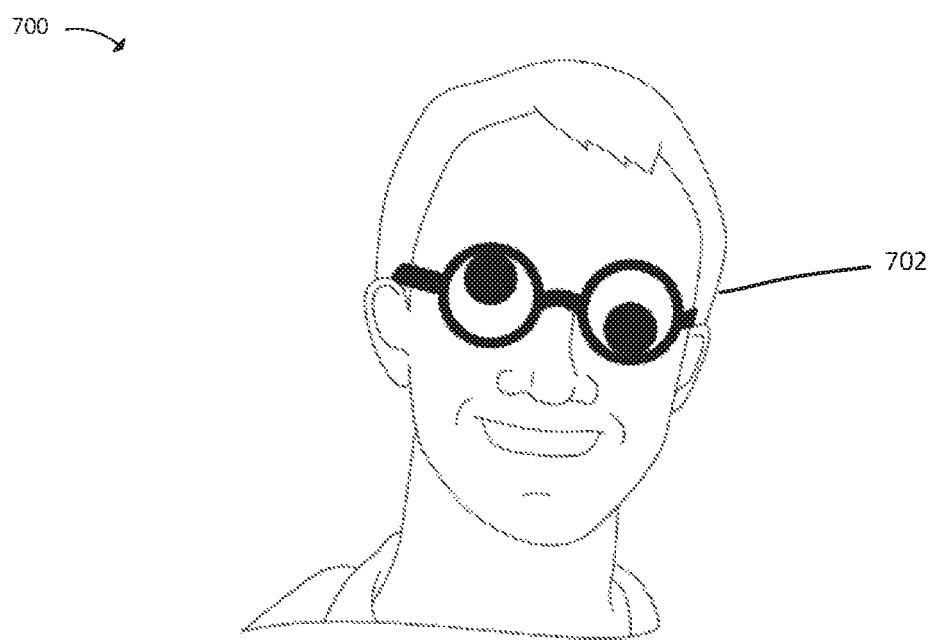
FIG. 7 illustrates an example of an image editing feature of an embodiment of an IFV system.

FIG. 7 illustrates an example of an image editing feature of an embodiment of an IFV system. Edited image 700 includes passenger with goggles 702. In some embodiments, the IFV system includes image editing capabilities that allows passenger to add features to their pictures. In some embodiments, the image editing feature can include layering, cropping, removal on unwanted elements, color changes, image enhancement, sharpening and softening images, contrast changing, brightening, and the like. The add-on features can include different hairstyles, different backgrounds, different facial features, special effects, and the like. For example, here, the passenger has added goggles 702 to their face. Based on how the passenger edits their pictures, the IFV system may provide recommendations. For example, here, the passenger has added goggles 702 to their image. Thus, the IFV system may recommend a sunglasses store at the destination.

In some embodiments, the image editing feature can utilize a data base of products from retailers, partner businesses, manufacturers, etc. The products can be, for example, sunglasses, lipstick, earrings, hats, and other accessories. For example, an airline, with the IFV system described herein, can form partnerships with retailers such as RayBan, L'Oreal, Warby Parker, Maybelline, etc. Due to these partnerships, the IFV system can have a database of images of products to apply to the passenger's picture. Passengers can, for example, experiment to evaluate which RayBan sunglasses look best on their face. After decided which sunglasses look best, they can place an order while on the flight. Thus, the glasses can be delivered to their home or destination.

In some embodiments, the IFV system can make recommendations based on the information gathered about the passenger. For example, a passenger traveling during the summer to a beach destination may be recommended a hat. The passenger, upon trying the hat using the image editing feature, can then order the hat to be delivered to their destination (i.e., hotel, airport, AirBnb, etc.). In some embodiments, the IFV system can make recommendations for complementary products. For example, if a passenger orders sunglass, the IFV system can subsequently recommend sunscreen or a hat.

Figure 8:
FIG. 8 illustrates an example of the caricaturizing feature of an embodiment of an IFV system.

FIG. 8 illustrates an example of the caricaturizing function of an embodiment of an IFV system. Caricature 800 includes caricaturized passenger image 802. This can be for entertainment purposes. Furthermore, this can become a factor in the abnormality analysis to assess the passenger's mood. For example, if the passenger's heart rate is high, their image shows them smiling, and they are using the caricaturizing feature, then the IFV system can determine that the passenger is happy. Subsequently, the IFV system can recommend further image editing features such as those in FIGS. 7 and 8.

Figure 9:
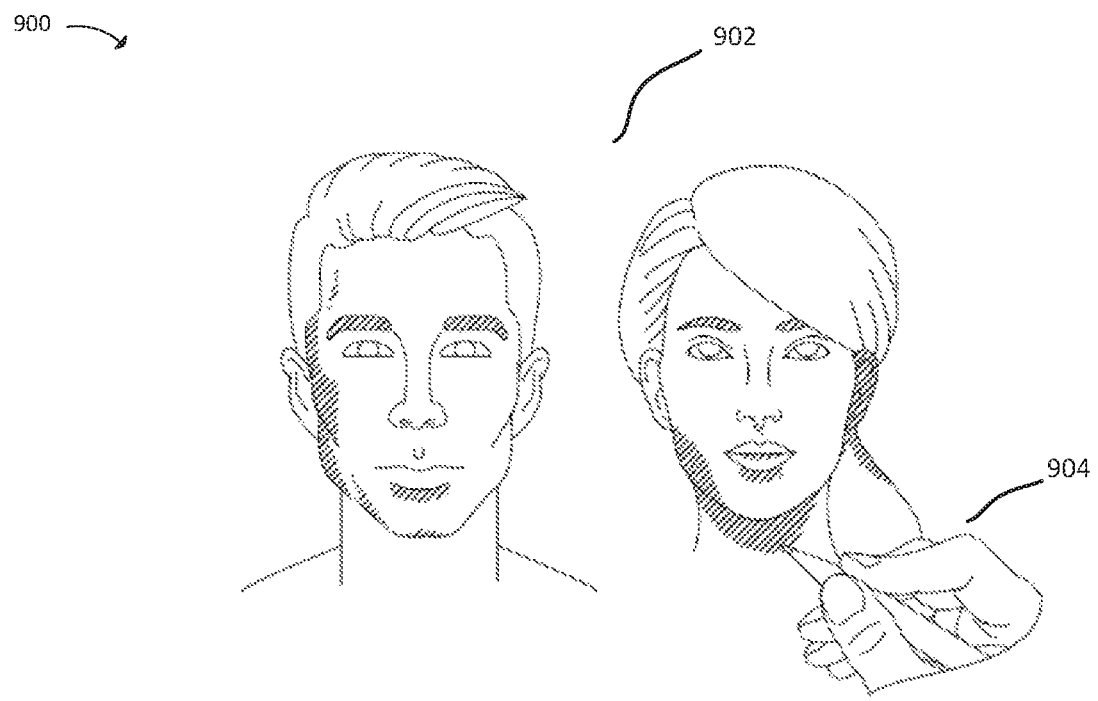
FIG. 9 illustrates an example of the outline feature of an embodiment of the IFV system.

FIG. 9 illustrates an example of the outline feature of an embodiment of the IFV system. Outline 900 includes outlined passenger images 902 and exemplary pencil 904. In some embodiments, the IFV can include the outlining feature. The outlining feature can take a passenger's image and convert it to look as though it was drawn in pencil. As in FIGS. 6, 7, and 8, this feature is to entertain the passenger and as a means of collecting data to understand how to improve and a personalize a passenger's travel time. For example, the IFV system can determine that the passenger using the outline feature is a child based on their picture and recent activities such as using the features described in FIGS. 6, 7 and 8. Upon this determination, the system can disable or enable content on the IFV system. This can include disabling content rated for adults such as movies, recommendations for alcohol, and the like.

Figure 10:
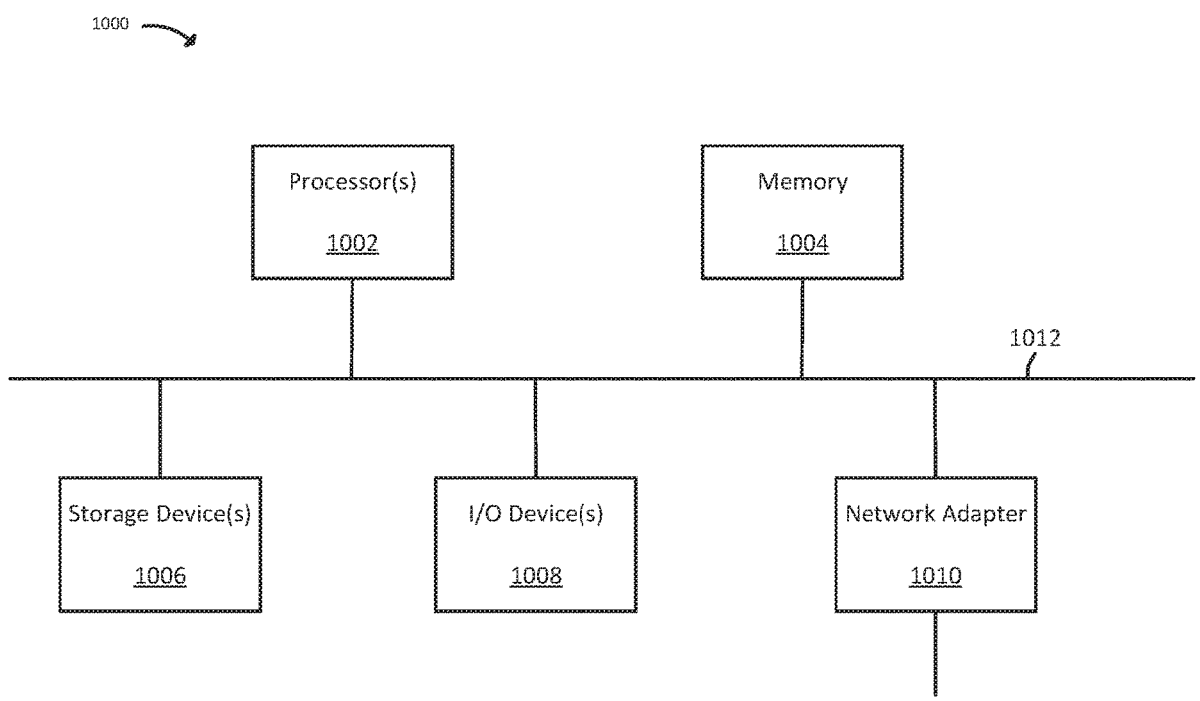
FIG. 10 is a block diagram illustrating a diagrammatic representation of a machine in the example form of a computer system operable to perform aspects of the disclosed technology.

FIG. 10 is a block diagram illustrating a diagrammatic representation of a machine in the example form of a computer system operable to perform aspects of the disclosed technology. The computing system 1000 may include one or more central processing units ("processors") 1002, memory 1004, input/output devices 1006 (e.g., keyboard and pointing devices, touch devices, display devices), storage devices 1008 (e.g., disk drives), and network adapters 1010 (e.g., network interfaces) that are each connected to an interconnect 1012. The interconnect 1012 is illustrated as an abstraction that represents any one or more separate physical buses, point to point connections, or both connected by appropriate bridges, adapters, or controllers. The interconnect 1012, therefore, may include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (i.e., FIREWIRE).

The memory 1004 and storage devices 1008 are computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer readable storage media (e.g. non-transitory media) and computer readable transmission media.

The instructions stored in memory 1004 can be implemented as software and/or firmware to program the processor 1002 to carry out actions described herein. In some embodiments, such software or firmware may be initially provided to the computing system 1000 by downloading it from a remote system through the computing system 1000 (e.g., via network adapter 1010).

Figure 11:
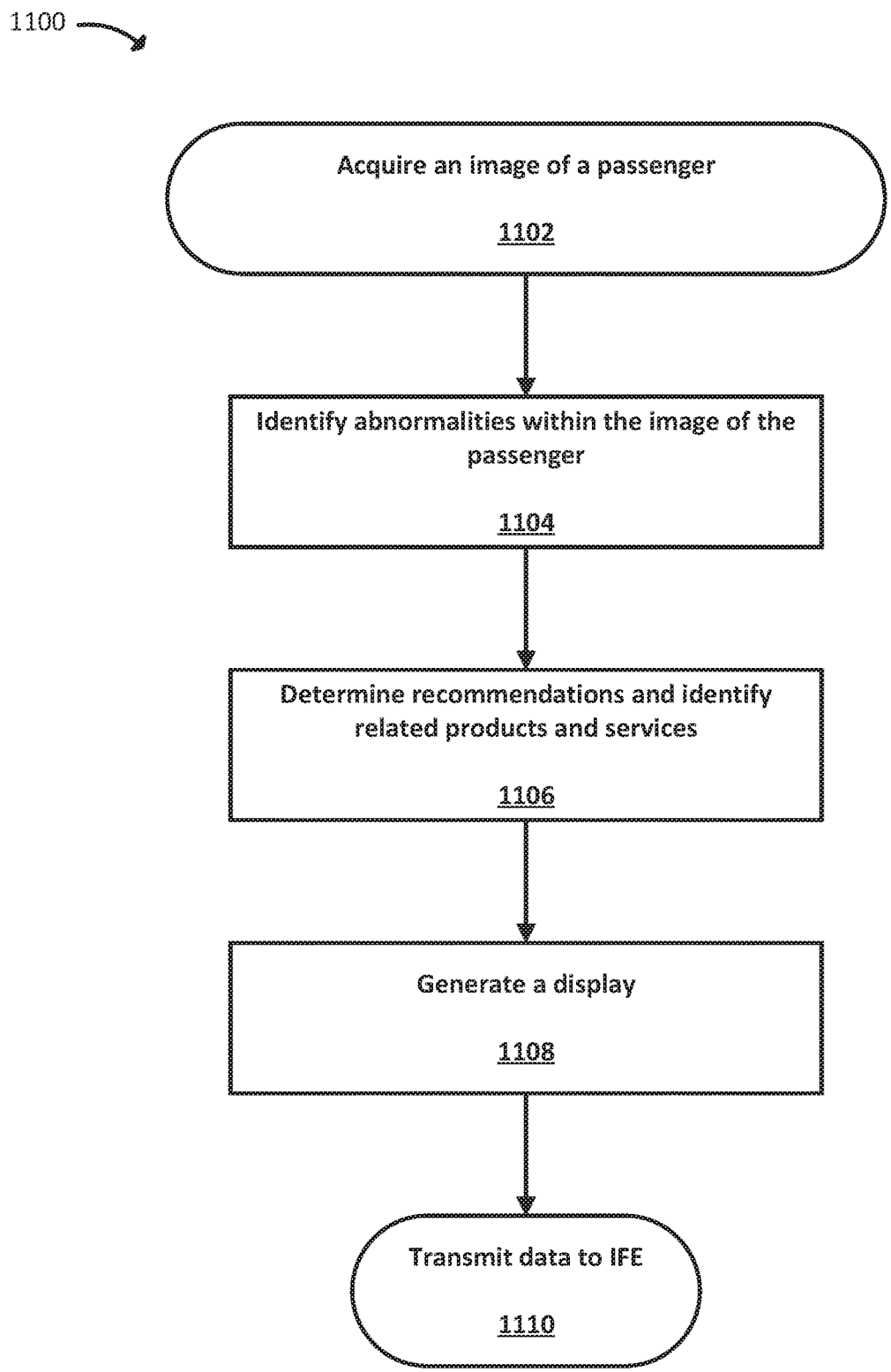
FIG. 11 is a flow diagram of a computer-implemented method for managing content on an in-flight entertainment platform, consistent with various embodiments.

FIG. 11 is a flow diagram of a computer-implemented method 1100 for managing content on an in-flight entertainment platform. At block 1102, the computer acquires an image of a passenger onboard a flight from a camera. In some embodiments, the camera can be directed towards the face of a passenger. In some embodiments, the camera can be structurally connected to the IFE platform, structurally separate from the IFE system, or both. At block 1104, the computer identifies abnormalities within the image of the passenger. In some embodiments, identifying abnormalities includes comparison to a picture of the passenger taken prior to boarding the flight. In some embodiments, identifying abnormalities includes acquiring sensor data generated a sensor suite and determining similarities between the sensor data and the image of the passenger. The sensor suite can include sensors such as a heart rate monitor, gyroscope, accelerometer, proximity sensory, optical sensor, temperature sensory, or any combination thereof.

At block 1106, the computer determines recommendations that relate to the identified abnormalities, wherein determining recommendations further includes identifying products and services related to the recommendations. In some embodiments, block 1106 includes identifying products and services, related to the recommendation, provided at the destination of the flight, the passenger, or both. At block 1108, the computer generates a display for prompting the passenger to view the identified products and services. Lastly, at block 1110, the computer can cause transmission of data indicative of the display to the in-flight entertainment platform. In some embodiments, block 1110 includes generating an edited image of the image of the passenger, wherein the edited image highlights where on the image of the passenger the abnormalities were detected.

In some embodiments, the method 1100 or other embodiments of the present disclosure can be implemented by an electronic device. The electronic device can be a first electronic device comprising a network interface for communicating with a second electronic device over a wireless communication channel, a processor, and a memory having instructions stored thereon. In some embodiments, the first electronic device is a mobile device of an airline passenger, and the second electronic device is an in-flight entertainment platform. Alternatively, the first electronic device is an in-flight entertainment platform, and the second electronic device is a mobile device of an airline passenger.

The instructions stored in the memory of the first electronic device, when executed by the processor, cause the processor to process an image of a passenger received from a camera via the network interface, identify abnormalities within the image of the passenger, determine recommendations that relate to the identified abnormalities, identify products and services provided on a flight and related to the recommendations, generate a display for prompting the passenger to view the identified products and services, and transmit data indicative of the display to an in-flight entertainment platform. In some embodiments, the instructions further cause the processor to overwrite memory of the image of the passenger.

In some embodiments, the teachings of the present disclosure can be implemented on an in-flight vanity system comprising a mobile device and an in-flight entertainment platform. The mobile device comprises a sensor suite operable to collect data indicative of the passenger and the environment surrounding the passenger, a processor operable to process an image of the passenger to detect abnormalities and determine recommendations, wherein the recommendations are related to the abnormalities, and a first communications module operable to transmit data indicative of the image of the passenger, the detected abnormalities, and the recommendations to a second communications module. The in-flight entertainment platform is structurally separate from the mobile device, the in-flight entertainment platform includes the second communications module operable to wirelessly receive data indicative of the image of the passenger, the detected abnormalities, and the recommendations, and a display operable to display data indicative of the image of the passenger, the abnormalities, and the recommendations.

In some embodiments, the mobile device and in-flight entertainment platform of the in-flight vanity system are communicatively coupled via WiFi, Bluetooth, Near-Field-Communications, or any combination thereof. Moreover, the sensor suite includes a heart rate monitor, gyroscope, accelerometer, proximity sensor, temperature sensor or any combination thereof.

In some embodiments, the processor identifies products and services related to the recommendations, wherein the products and services are available on board a flight. Furthermore, the display is operable to display the products and services.

In some embodiments, the mobile device further comprises a camera operable to be directed towards a face of the passenger.

In some embodiments, the mobile device further comprises a memory module operable to store data indicative of the detected abnormalities and recommendations.

The various embodiments introduced herein can be implemented by, for example, programmable circuitry (e.g. one or more microprocessors, programmed with software and/or firmware), or entirely in special-purpose hardwired circuitry (i.e., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A computer-implemented method for managing content on an in-flight entertainment platform, the method comprising:
acquiring an image of a passenger onboard a flight from a camera;
identifying an abnormality relating to a health condition within the image of the passenger;
determining recommendations that relate to the identified abnormality, wherein determining the recommendations includes:
identifying products and services related to the recommendations;
generating a display that prompts the passenger to view the identified products and services; and
causing transmission of data indicative of the display to the in-flight entertainment platform.

2. The computer-implemented method of claim 1, wherein the camera is directed towards a face of the passenger.

3. The computer-implemented method of claim 1, wherein the camera is included in a mobile device of the passenger, the mobile device communicatively coupled to the in-flight entertainment platform and structurally separate from the in-flight entertainment platform.

4. The computer-implemented method of claim 1, wherein identifying the abnormalities within the image of the passenger, further includes:
comparing the image of the passenger to a different picture of the passenger taken prior to boarding the flight.

5. The computer-implemented method of claim 1, wherein identifying abnormalities within the image of the passenger, further includes:
acquiring sensor data generated by a sensor suite; and
determining similarities between the sensor data and the image of the passenger.

6. The computer-implemented method of claim 5, wherein the sensor suite includes a heart rate monitor, gyroscope, accelerometer, proximity sensor, optical sensor, temperature sensor, or any combination thereof.

7. The computer-implemented method of claim 1, wherein determining recommendations that relate to the identified abnormalities, further includes:
identifying products and services provided at a destination of the flight or the passenger, the products and services related to the recommendations.

8. The computer-implemented method of claim 1, wherein generating a display, further includes:
generating an edited image of the image of the passenger, wherein the edited image highlights where on the image of the passenger the abnormalities were detected.

9. A first electronic device comprising:
a network interface for communicating with a second electronic device over a wireless communication channel;
a processor; and
a memory having instructions stored thereon that, when executed by the processor, cause the processor to:
process an image of a passenger received from a camera of the second electronic device via the network interface,
identify an abnormality relating to a health condition within the image of the passenger,
determine recommendations that relate to the identified abnormality,
identify products and services provided on a flight, the products and services related to the recommendations,
generate a display for prompting the passenger to view the identified products and services, and
transmit data indicative of the display to an in-flight entertainment platform.

10. The electronic device of claim 9, wherein the first electronic device is a mobile device of the passenger, and the second electronic device is the in-flight entertainment platform.

11. The electronic device of claim 9, wherein the first electronic device is the in-flight entertainment platform, and the second electronic device is a mobile device of the passenger.

12. The electronic device of claim 9, wherein the instructions further cause the processor to:
overwrite memory of the image of the passenger.

13. An in-flight vanity system comprising:
mobile device comprising:
a sensor suite operable to collect data indicative of a passenger and an environment surrounding the passenger;
a processor operable to process an image of the passenger to detect an abnormality relating to a health condition and determine recommendations, wherein the recommendations are related to the abnormality; and
a first communications module operable to transmit data indicative of the image of the passenger, the detected abnormalities, and the recommendations to a second communications module; and
an in-flight entertainment platform structurally separate from the mobile device, the in-flight entertainment platform including:
the second communications module operable to wirelessly receive data indicative of the image of the passenger, the detected abnormalities, and the recommendations; and a display operable to display data indicative of the image of the passenger, the abnormalities, and the recommendations.

14. The system of claim 13, wherein the mobile device and in-flight entertainment platform are communicatively coupled via WiFi, Bluetooth, Near-Field-Communications, or any combination thereof.

15. The system of claim 13, wherein the sensor suite includes a heart rate monitor, gyroscope, accelerometer, proximity sensor, temperature sensor or any combination thereof.

16. The system of claim 13, wherein the processor identifies products and services related to the recommendations, wherein the products and services are available on board a flight.

17. The system of claim 16, wherein the display is operable to display the products and services.

18. The system of claim 13, wherein the mobile device further comprises:
a camera operable to be directed towards a face of the passenger.

19. The system of claim 13, wherein the mobile device further comprises:
a memory module operable to store data indicative of the detected abnormalities and recommendations.

20. The computer-implemented method of claim 1, wherein the recommendations that relate to the identified abnormality include a recommendation to stretch or a recommendation to walk in an aircraft aisle.

* * * * *